United States Patent
Huang

[11] Patent Number: 5,946,140
[45] Date of Patent: Aug. 31, 1999

[54] FIBER LENS FOR USE WITH A CONFOCAL LENS SYSTEM

[75] Inventor: Sun-Yuan Huang, Maidencreek Township, Berks County, Pa.

[73] Assignee: Lucent Technologies Inc., Murray Hill, N.J.

[21] Appl. No.: 09/036,641

[22] Filed: Mar. 6, 1998

[51] Int. Cl.[6] .............................. G02B 27/30; G02B 3/06
[52] U.S. Cl. ............................................. 359/641; 359/710
[58] Field of Search ..................................... 359/641, 710, 359/249; 385/15, 19

[56] References Cited

U.S. PATENT DOCUMENTS 5,181,224  1/1993  Snyder ..................................... 372/101

*Primary Examiner*—Georgia Epps
*Assistant Examiner*—Michael A Lucas

[57] ABSTRACT

A lens system for use with elliptical optical sources includes a spherical fiber lens disposed beyond a conventional confocal lens arrangement. The spherical fiber lens is disposed in the optical path at the point where the slow axis (X ray) crosses the fast axis (Y ray); the rays will be "circular" and will thereafter propagate as a circular wavefront. The coupling efficiency of such a system is thus improved from approximately 40% to over 80%. The radius of the spherical endface of the fiber lens may be adjusted to improve the coupling efficiency. The spherical fiber lens is easily formed by fusing a section of "coreless" silica fiber onto the endface of a conventional single mode fiber. The end of the silica fiber is thereafter prepared (by heating, etching, polishing, or laser machining, for example) to provide a spherical endface with the desired radius.

6 Claims, 2 Drawing Sheets

5,946,140

FIBER LENS FOR USE WITH A CONFOCAL LENS SYSTEM

TECHNICAL FIELD

The present invention relates to a fiber lens for use with a confocal lens system and, more particularly, to a symmetric spherical fiber lens for improving the coupling efficiency of elliptically launched beams into conventional single mode fiber.

BACKGROUND OF THE INVENTION

There are a variety of semiconductor lasers that emit an elliptical beam. In particular, the conventional 980 nm GaAs lasers used as a pump laser source for optical amplification systems emit such an elliptical beam. Since the associated optical systems utilize transmission fibers with circular core regions, much of the launched power may be lost. In particular, conventional optical systems may capture only about 40% of the launched power from an elliptical beam.

One known solution to this problem is to utilize an anamorphic fiber micro-lens, which achieves a coupling efficiency of about 70%. However, the microlens requires very stringent alignment tolerances. Additionally, the ellipticity of the launched beam may vary, depending upon the manufacturer (for example, the ratio of far-field angles between the vertical and horizontal directions can vary from 2.5 to 4.5, depending upon the manufacturer). Thus, even the best anamorphic design may not be suitable for all situations.

Therefore, a need remains in the art for a system of improving the coupling efficiency of elliptical beams into an optical communication system.

SUMMARY OF THE INVENTION

The need remaining in the art is addressed by the present invention, which relates to a fiber lens for use with a confocal lens system and, more particularly, to a fiber lens comprising a symmetric spherical lens fused to the endface of the conventional single mode transmission fiber. The symmetric spherical fiber lens is incorporated with conventional confocal optics and disposed at the output of the transmission system. The spherical lens functions to reduce the magnification of the "slow axis" X-direction beam of the elliptical emission, as well as reduce the diffraction of the "fast axis" Y-direction beam of the transmission. The inclusion of the symmetric spherical fiber lens results in improving the coupling efficiency to over 80% for most arrangements.

In on embodiment, the spherical fiber lens is fabricated by fusing a section of "coreless" silica to a single mode fiber. The coreless rod is then heated to form a spherical endface. By this process, the lens is inherently symmetrical. Therefore, the beam magnification is compensated along one axis and the beam diffraction effect along the remaining axis. As a result, a launched elliptical beam, upon passing through a properly located symmetric spherical fiber lens, will be converted into an essentially circular wavefront.

An additional advantage of the spherical fiber lens of the present invention is that it is also useful with systems launching an essentially circular wavefront. Due to manufacturing tolerances, many semiconductor lasers (such as a 1480 nm pump laser) may emit a beam with slight ellipticity. The lens system of the present invention is capable of correcting for this slight ellipticity.

Various and other advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
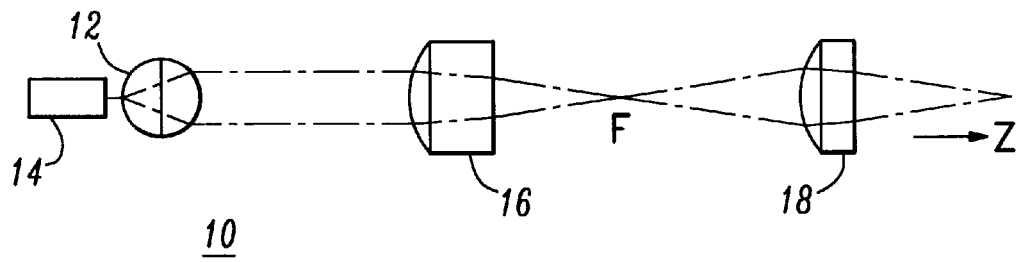
FIG. 1 illustrates a prior art confocal optical system.

A conventional prior art confocal lens system 10 for use with an elliptical source is illustrated in FIG. 1. A ball lens 12 is positioned in front of a laser diode 14 so as to collect the divergent beam. As shown, the beam is essentially collimated as it passes through ball lens 12. A first corrective confocal lens 16 is disposed to focus the collimated beam, and the beam thereafter passes through a focal point F and again begins to diverge. The divergent beam is then intercepted by a second confocal lens 18 that again focuses the beam. As the beam propagates through this system, the ellipticity is not corrected.

Figure 2:
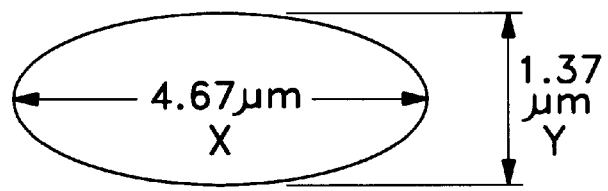
FIG. 2 contains a diagram of horizontal and vertical mode field diameters associated with an exemplary elliptical beam.

For a conventional 980 nm pump laser used in an optical system such as system 10 of FIG. 1, the horizontal far-field angle may vary from 5° to 15°, and the vertical far-field may vary from 20° to 30°. An exemplary pair of angles may be 9° for the horizontal and 30° for the vertical. The mode field diameters corresponding to this exemplary pair of angles, as illustrated in FIG. 2, would be 4.67 $\mu$m for the horizontal diameter and 1.37 $\mu$m for the vertical diameter. In a conventional system such as system 10 of FIG. 1, a laser with this exemplary elliptical mode would exhibit a coupling efficiency of approximately 44%.

Figure 3:
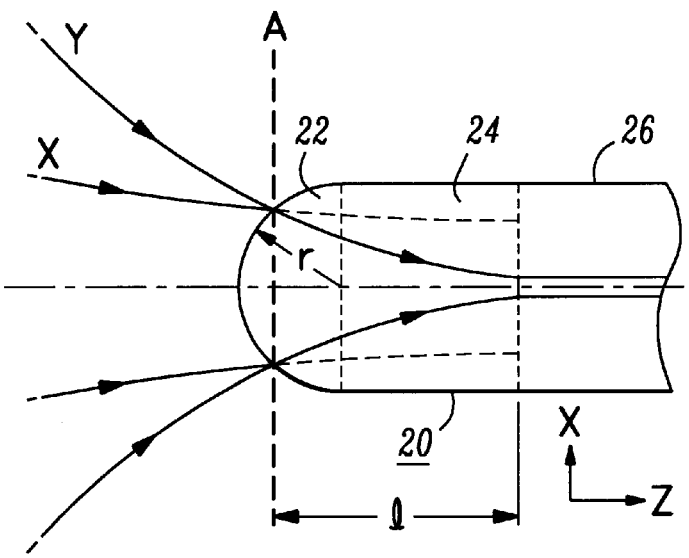
FIG. 3 illustrates an exemplary symmetric spherical fiber lens of the present invention.

In accordance with the teachings of the present invention, a symmetric spherical lens is used to reduce the magnification of the "slow" X-axis beam and also reduce the diffraction of the "fast" Y-axis beam, thereby forming an essentially circular wavefront. FIG. 3 illustrates an exemplary symmetric spherical fiber lens 20 of the present invention and includes a ray tracing diagram illustrating the X and Y beams of an exemplary elliptical laser emission. The location where these rays cross is indicated by the vertical line, denoted by the letter "A" in FIG. 3. The crossing location is critical, since this is point at which both beams are circular in form. In accordance with the present invention, symmetric spherical fiber lens 20 is disposed at this crossing location, and will thereafter allow for a circular wave to propagate beyond the fiber lens. In particular, fiber lens 20 comprises a symmetric spherical end section 22 formed to comprise a predetermined radius r. The "coreless" fiber portion 24, including spherical end section 22, is attached to single mode fiber 26, where fiber 26 may be a portion of the actual transmission fiber associated with the optical transmitter.

Figure 4:
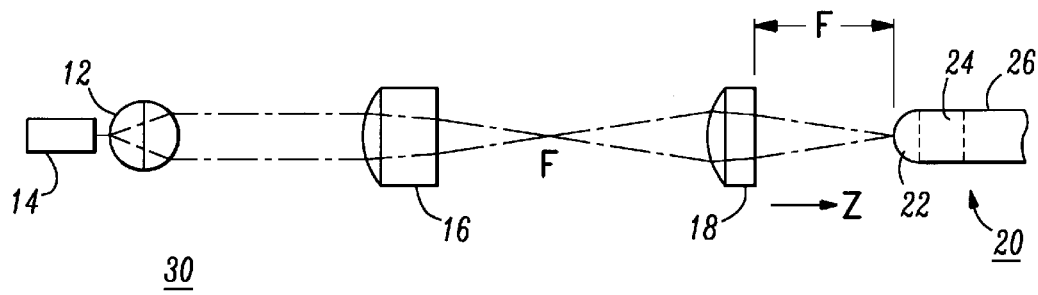
FIG. 4 illustrates an optical system including the symmetric spherical fiber lens of the present invention.

FIG. 4 illustrates an exemplary lens system 30 of the present invention, incorporating symmetric spherical fiber lens 20 as discussed in FIG. 3 with the prior art confocal lens system 10 of FIG. 1. The positioning of symmetric spherical fiber lens 20 along the optical (Z) axis has been found to influence the coupling efficiency of the overall system. Table I is a chart of X and Y mode-field diameters ($2\omega_x$ and $2\omega_y$, respectively) for the exemplary elliptical beam pattern of FIG. 2. The ratio of these diameters, $\omega_x/\omega_y$, is also listed:

TABLE I

| Z ($\mu$m) | −200 | −185 | −170 | At focus |
|---|---|---|---|---|
| $2\omega_x$ ($\mu$m) | 23.1 | 23.5 | 23.5 | 22.7 |
| $2\omega_y$ ($\mu$m) | 25.1 | 23.6 | 22.6 | 10.0 |
| $\omega_x/\omega_y$ | 1.09 | 1.00 | 0.96 | 2.27 |

Symmetric spherical fiber lens 20 is disposed, as shown in FIG. 4, along optical axis Z beyond the conventional confocal optics. The above data relates to positioning fiber lens 20 at the "focus" of the conventional system, as well as at three different locations (closer to lens 18) along optical axis Z. For the exemplary arrangement described above, the optimum placement of symmetric spherical fiber lens 20 would be at −185 $\mu$m with respect to the system focal point, since at this point the X and Y fields are essentially identical (i.e., $\omega_x/\omega_y=1$) and the wavefront is therefore essentially circular.

An exemplary spherical fiber lens may be formed by fusing a section of "coreless" silica fiber onto the endface of a single mode fiber. A variety of methods (polishing, etching, heating, or laser machining, for example) may then be used to "round" the endface of the coreless section to form the spherical endface. The radius, r, of the spherical endface may vary, where the coupling efficiency will differ as a function of the radius. Table II illustrates coupling efficiency as a function of radius for a system using a 980 nm laser:

TABLE II

| R (mm) | $P_{image}$ (mm) | $2\omega_x$ ($\mu$m) | $2\omega_y$ ($\mu$m) | CE (%) |
|---|---|---|---|---|
| 0.060 | 0.171 | 6.7 | 6.1 | 84.9 |
| 0.065 | 0.176 | 7.5 | 6.7 | 87.3 |
| 0.070 | 0.188 | 7.3 | 6.7 | 88.4 |
| 0.075 | 0.191 | 8.4 | 7.2 | 87.7 |
| 0.080 | 0.201 | 8.1 | 7.3 | 85.2 |

As shown, the best coupling efficiency is 88.4%, and is associated with a radius of 0.07 mm, where this coupling efficiency yields a 3 dB improvement over the prior art confocal arrangement. In general, a radius in the range from 0.050–0.100 mm has been found to have acceptable performance.

Figure 5:
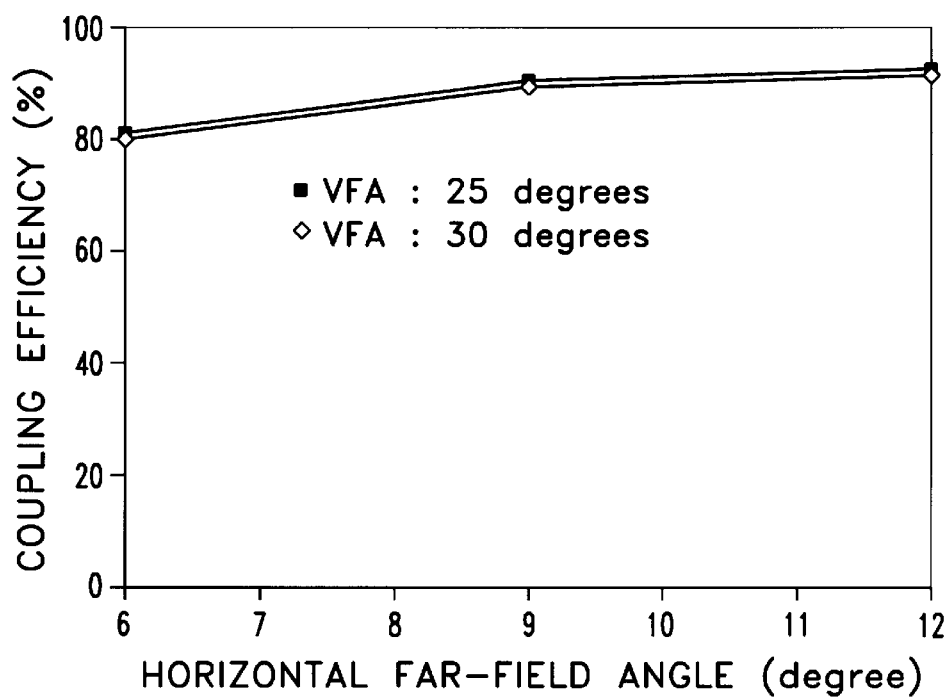
FIG. 5 is a graph of the coupling efficiency of the arrangement of the present invention as a function of the horizontal far-field angle.

As mentioned above, the horizontal and vertical far-field angles associated with elliptical optical beams may vary (as a function of the waveguide structure or manufacturing process, for example). Indeed, as stated above, the horizontal far-field angle may vary between 6–12°, while the vertical far-field angle may vary between 25–30°. It is an advantage of the symmetric spherical lens of the present invention that the coupling efficiency may be increased over the entire possible range of far-field angles. FIG. 5 is a graph of coupling efficiency as a function of horizontal far-field angle for a pair of exemplary vertical far-field angles, 25° and 30°. As shown, the coupling efficiency has a minimum of approximately 80% at a horizontal far-field angle of 6° for either vertical far-field angle, and improves to over 90% at a horizontal far-field angle of 12° (again, regardless of vertical far-field angle).

Various other arrangements are possible. For example, the inclusion of a symmetric spherical fiber lens in other optics systems may also prove valuable. That is, lasers which nominally launch a circular wavefront have been found to launch a slightly elliptical wavefront (as a function of process variations, for example). Therefore, a symmetric spherical fiber lens may be incorporated in such systems to provide the necessary correction. In summary, the present invention is useful in converting any elliptical beam into a circular wavefront and is limited in spirit and scope only by the claims as appended hereinbelow.

What is claimed is:

1. A lens system for converting an elliptical optical beam defined as exhibiting a first, slow axis component and a second, fast axis component into an essentially circular optical beam, the lens system comprising a symmetric spherical fiber lens disposed at a location where the fast axis component crosses the slow axis component for reducing the magnification of said slow axis component and diffracting said fast axis component to convert the elliptical beam into an essentially circular beam.

2. A lens system as defined in claim 1 wherein the system further comprises a ball lens for intercepting a diverging elliptical beam and converting the divergent beam into a collimated wavefront;

a first confocal lens disposed to intercept the collimated wavefront from said ball lens; and a second confocal lens disposed to intercept a diverging beam exiting said first confocal lens, the symmetric spherical fiber lens disposed beyond said second confocal lens.

3. A lens system as defined in claim 2 wherein the elliptical beam exhibits a horizontal far-field angle in the range of 5–15° and a vertical far-field angle in the range of 20–30°, the second confocal lens defining a lens system focal point and the symmetric spherical fiber lens being positioned within 200 $\mu$m of said focal point.

4. A lens system as defined in claim 1 wherein the symmetric spherical fiber lens comprises a radius between 0.050 and 0.100 mm.

5. A lens system as defined in claim 1 wherein the spherical fiber lens comprises a first silica fiber section including a symmetric spherical first endface and a planar second endface, and a single mode optical fiber including a first planar endface, said silica fiber second endface attached to the first planar endface of said single mode fiber.

6. A lens system as defined in claim 5 wherein the silica fiber section is fused to the single mode fiber.

* * * * *